United States Patent Office 3,506,675
Patented Apr. 14, 1970

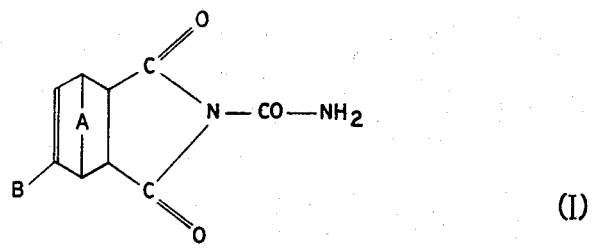
(I)
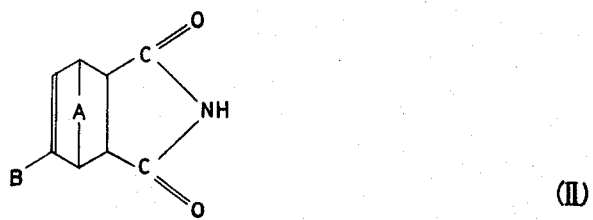
(II)
(III)
(IV)

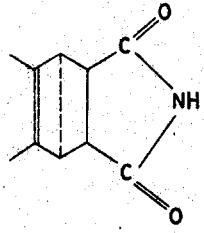
(V)
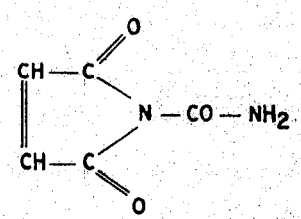
(VI)
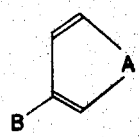
(VII)

1

3,506,675
COMPOUND, N - CARBAMYL - 5-(α-HYDROXY-α-2-PYRIDYL - BENZYL)-7-(α-2-PYRIDYL - BENZYLIDENE)-5-NORBORNENE-2,3-DICARBOXIMIDE
Kálmán Harsányi, Kálmán Takács, Dezsö Korbonits, and Csaba Szathmáry, Budapest, Hungary, assignors to Chinoin Gyogyszer es Vegyeszeti Termekek Gyara, Budapest, Hungary
Filed Jan. 17, 1967, Ser. No. 609,963
Claims priority, application Hungary, Jan. 20, 1966, CI 605; Jan. 26, 1966, CI 607
Int. Cl. C07d 31/44
U.S. Cl. 260—295                                1 Claim

ABSTRACT OF THE DISCLOSURE

New N - carbamyl - $\Delta^4$-cis-cyclo-hexene-dicarboximides compounds exhibiting rodenticidal activity which may be transformed into known $\Delta^4$-cis-cyclo-hexene-1,2-dicarboximides which may be per se used in rodenticidal compositions or may be applied as intermediates for the preparation of known rodenticidal compounds and method of preparing said compounds.

This invention relates to new N-carbamyl-$\Delta^4$-cis-cyclo-hexene-dicarboximides, which exhibit rodenticidal activity and may be transformed into known $\Delta^4$-cis-cyclo-hexene-1,2-dicarboximides. Thus the invention is directed to compounds which may be used either themselves in rodenticidal compositions or may be applied as intermediates for the preparation of known rodenticidal agents. The invention also relates to the preparation of both the N-carbamyl-$\Delta^4$-cis-cyclohexene and the $\Delta^4$-cis-cyclohexene dicarboximide derivatives and also to pesticide compositions comprising the new N-carbamyl-$\Delta^4$-cis-cyclohexene-dicarboximides and to the preparation thereof.

According to a feature of the present invention there are provided new compounds of the Formula I, and their salts (wherein A stands for —O—, —CH$_2$—, or a group of the Formula III or 1—1 hydrogen atoms in positions 3 and 6; R$^1$ and R$^2$ stand for an unsubstituted phenyl or pyridyl radical; B stands for hydrogen or for a group of the Formula IV, in which R$^1$ and R$^2$ have the same meaning as stated above, provided that if A stands for —CH$_2$—, B does not represent hydrogen).

It has been found that said compounds possess an extremely specific toxicity and are suitable for the extermination of certain harmful mammals. The compounds of the Formula I may also be transformed into known norbornene-dicarboximides, e.g. to te compounds disclosed in Science 144, 412 (1964).

A particularly suitable representative of the compounds of the Formula I is the N-carbamyl-5-(α-hydroxy-α-2-pyridyl-benzyl)-7-(α-2-pyridyl-benzylidene) - 5 - norbornene-2,3-dicarboximide and its salts.

The definition of Formula I encompasses all possible stereoisomers and the mixtures of the compounds of the Formula I.

According to a further feature of our invention there is provided a process for the preparation of compounds of the Formula I, (wherein A and B have the same meaning as stated above) which comprises reacting compounds of

2 the general Formula VII, (wherein A and B have the same meaning as stated above), with N-carbamylmaleimide.

The process may be carried out preferably in an organic solvent such as aliphatic or aromatic hydrocarbons, halogenated hydrocarbons, ethers, or ketones, It is particularly preferred to use benzene, chloroform, dioxane, methylethylketone as solvent.

The Diels-Alder reaction may be accomplished preferably without heating or possibly under cooling at a temperature in the range of 0–30° C. preferably at 10–20° C. If the molecule contains a pyridyl group it is not advisable to work at higher temperature because the carbamyl radical may be spontaneously split off partially.

The advantage of the compounds of the Formula I is that they possess an exteremely high toxicity on rats, while on other animals or humans they proved to be practically intoxical. Thus the toxicity of N-carbamyl-5-(α-hydroxy-α-2-pyridyl-benzyl)-7-(α-2-pyridyl - benzylidene) - 5 - norbornene-2,3-dicarboximide on albino rats amounts to LD$_{400}$=12 mg./kg. while it was found to be practically introxical against humans or useful mammals.

According to a further feature of the present invention there are provided rodenticidal compositions and a process for the preparation thereof. Said compositions comprise as active ingredient at least one compound of the Formula I or a salt thereof in admixture was suitable solid or liquid carriers. It is preferred to use the N-carbamyl-5-(α-hydroxy-2-2-pyridyl-benzyl)-7-(α - 2 - pyridyl-benzilidene)-5-norbornene-2,3-dicarboximide as active ingredient. The compositions may be present in the form of powders, sprays, solutions, emulsions, or suspensions. The suitable solid or liquid carriers and the processes for the preparation of compositions are known per se. As carriers e.g. masking agents, such as meat meal, ground meat, various meals etc. may be used. The compositions may also contain further additives such as emulsifiers, and/or other known rodenticides. The compositions may be prepared by admixing the active ingredient with the suitable solid or liquid carrier and optionally adding the further additives.

According to a still further feature of our invention there is provided a process for the preparation of $\Delta^4$-cis-cyclohexene - 1,2 - dicarboximides of the Formula II wherein A stands for —O—, —CH$_2$—, or a group of the Formula III or 1—1 hydrogen atoms in positions 3 and 6; R$^1$ and R$^2$ stand for a phenyl or pyridyl radical which may be substituted by a nitro, amino or halogeno group; B stands for hydrogen or for a group of the Formula IV, in which
R$^1$ and R$^2$ have the same meaning as stated above, which comprises reacting N-carbamyl-$\Delta^4$-cis-cyclohexene-1,2-dicarboximides of the general Formula I (wherein
A stands for —O—, —CH$_2$— or a group of the Formula III or 1—1 hydrogen atoms in positions 3 and 6;
R$^1$ and R$^2$ stand for a phenyl or pyridyl radical which may be substituted by a nitro, amino or halogeno group;
B stands for hydrogen or for a group of the Formula IV in which
R$^1$ and R$^2$ have the same meaning as stated above, with an aqueous acid or base or with a nucleophile reactant or heating the compounds of the Formula I in the presence of a weak basic group at a temperature above 70° C.

The advantage of the above process resides in the high yields obtained.

Several methods are known for the preparation of compounds comprising the cyclohexene-dicarboximide group of the Formula V. According to one of the known procedures compounds containing conjugated double-bonds are reacted with maleic anhydride according to the Diels-Alder-diene-synthesis, whereupon the 1,2-dicarboxylic-acid anhydrides are converted to the corresponding amides with ammonia and the amides are subjected to ring closure to form dicarboxylic acid imides. The disadvantage of the above process resides in the fact that being a multistep method considerable losses of the diene component occur. Another known process comprises the use of maleimide by diene-synthesis. A relatively simple synthesis of maleimide has been described in recent literature (J. Org. Chem. 25, 56 (1960)). According to this process maleic anhydride is reacted with urea whereupon acylation takes place and N-carbamylmaleamic acid is obtained, which is subjected to ring closure in the presence of acetic anhydride as water-binding agent to form the N-carbamylmaleimide of the Formula VI. Maleimide may be obtained from the N-carbamylmaleimide by means of thermal decomposition. The substituent of the nitrogen atom of the ring is split off in the form of cyanic acid, which trimerizes to form cyanuric acid; the product is to be separated from said compound. The maleimide is obtained by means of a quick distillation (polymerization) carried out in vacuo at 5 Hg mm. The yield calculated on the raw product amounts to 85.9%.

If the expensive diene component is used for the diene-synthesis it is preferred to subject the maleimide to further purification. Pure maleimide may be obtained with a total yield of 75–80%. However, the process may be carried out rather difficultly even in laboratory because of the solidification of the fraction and the subsequent decrease of vacuum. On industrial scale the decomposition makes the process still more difficult and causes serious apparative problems.

According to this aspect of the process of the present invention N-carbamyl-Δ⁴-cis-cyclohexene-1,2-dicarboximides are used as starting material. One representative of said compounds, the addition product of N-carbamylmaleimide and cyclopentadiene is a known compound (J. Med. Pharm. Chem. 5, 772 [1962]). The other starting materials are new compounds corresponding to the Formula I and may be prepared as described hereinbefore.

Our invention is based on the recognition that the chemical properties of N-carbamyl-Δ⁴-cyclohexene-1,2-dicarboximides differ fundamentally from those of the known N-carbamylmaleimide and this enables to split off the carbamoyl-group under such conditions which would not make possible to split the known N-carbamylmaleimide.

N-carbamylmaleimide belongs to the relatively rare ammonia derivatives containing three acyl-groups on the nitrogen atom. These compounds are capable to acylate while decreasing their grade of acylation. The above property of N-carbamylmaleimide is known (J. Org. Chem. 25, 56 [1960]); with alcohols it forms alkyl-N-carbamylmaleamates

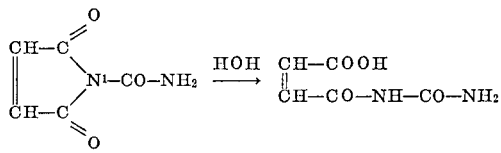

According to our experiments N-carbamyl-maleamic acid may be obtained by dissolving the product in a base and acidifying the solution. (See Example 16a.)

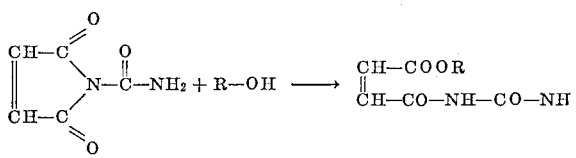

The above reactions show unambiguously, that while acylating both alcohol and water the ring opens. The carbamyl-group cannot be removed neither by hydrolysis nor by alcoholysis. Accordingly it was expectable that by treating the N-carbamoyl-derivatives of the Formula I with aqueous acids or bases the ring would open. However it has been found according to the present invention that this reaction does not take place, but it is the N-carbamyl-group which is split off.

The part of the N-carbamyl-Δ⁴-cis-cyclohexene-1,2-dicarboximide molecule, which does not participate in the process according to the present invention, may be formed and substituted in various ways. Thus the Δ⁴-cyclohexene-ring may bear substituents in position 4. Said substituents may correspond to the general Formula IV wherein R¹ and R² have the same meaning as stated above. The cyclohexene ring may be bridged through an oxygen atom, a methylene group or a group of the general Formula III, (wherein R¹ and R² have the same meaning as stated above).

As mentioned above the N-carbamyl-compounds used as starting material may be prepared by means of a diene-synthesis. According to a preferred form of realization of our process the Δ⁴-cis-cyclohexene-1,2-dicarboximides may be prepared without isolating the N-carbamyl derivatives, directly from the reaction mixture containing same.

According to the process of the present invention the starting material is treated with an aqueous acid or an aqueous base. The reaction may be carried out in this aspect preferably at room temperature, possibly in the presence of a small amount of a water-miscible organic solvent, such as dioxane, alcohols, acetone. The reaction takes place practically as soon as the component is dissolved. The reaction mixture may be generally worked up by neutralising the same, whereby the reaction product precipitates at a pH value of 6.5–7.5. Precipitation may be completed by evaporating the reaction mixture at pH 6.5–7.5 if desired.

The N-carbamyl group may be split off in a nonaqueous medium by using a nucleophile reactant. As nucleophile reactant lower aliphatic alcohols, preferably those containing 1–4 carbon atoms, or primary or secondary amines or metal-salts of organic compounds (alcoholates, enolates) may be used. According to this method it is preferred to work at higher temperatures.

The Δ⁴-cis-cyclohexene-1,2-dicarboximides of the Formula II may also be prepared by heating the N-carbamyl-derivatives of the Formula I at a temperature above 70° C., preferably at 80–100° C., in the presence of a basic substance in a solvent. As basic substance preferably pyridine may be used but other substances of alkaline character, such as chinoline, triethylamine and the like may be used as well. If the starting material comprises a pyridyl-radical, addition of further bases is not necessary.

If the reaction is carried out directly in the reaction mixture obtained by the diene-synthesis, i.e. without isolating the N-carbamyl-derivative, one may proceed preferably by accomplishing the diene-synthesis at a temperature in the range of 60–130° C. and adding a catalytic amount of pyridine to the reaction mixture. If the reaction is carried out this way, the carbamyl group is split off immediately after the Diels-Alder reaction. If the diene-component contains a basic group, the carbamyl group may be split off spontaneously directly after the diene-synthesis, but the reaction is not always complete, so that it is preferable to complete the reaction by adding a further nucleophile reactant.

Further details of our process are to be found in the examples. It is, however, by no means intended to limit the invention to the specific examples.

EXAMPLE 1

7.38 g. of a geometric isomer-mixture of 2-(α-hydroxy-α-2-pyridyl-benzyl)-6-phenyl-6-(2 - pyridyl - fulvene are placed into a 100 ml. three -necked flask equipped with a stirrer and a reflux condenser whereupon 2.52 g. of N-carbamyl-maleimide and 50 ml. of chloroform are added and the reaction mixture is stirred at room temperature for 2 days. The solvent is then distilled off in vacuo at 20° C. The residue consists of the geometric isomer mixture of N-carbamyl-5-(α-hydroxy-α-2-pyridyl-benzyl) - 7 - (α-2-pyridyl - benzylidene) - 5 - norbornene-2,3-dicarboximide; the chlorine content of the product amounts to 14.35%, accordingly it contains also 16.1% of chloroform.

*Analysis.*—C%=63.36; H%=4.20; N%=8.21; Cl%=14.35.

Taking into consideration the chloroform-contaminations, the following analysis data are obtained:
C%=73.50; H%=5.01; N%=9.81.

The calculated analysis data of the product thus obtained are as follows:
C%=73.63; H%=4.72; N%=10.10. Molecular weight 554.58.

The determination of carbon dioxide has been carried out by treating the product with a base and then acidifying the mixture (see Magy. Kem. Fo. 67,501, 531, 533, [1961]). The value measured amounts to 6.50%, which corresponds to a carbon dioxide content of 7.75% when taking into consideration the chloroform-contamination of 16.1%. (The carbon dioxyde content of the product calculated on the base of the above molecular weight amounts to 7.93%).

EXAMPLE 2

60 ml. of chloroform and 30 ml. of dioxane are added to 8.28 g. of 2-(α-hydroxy-α-2-pyridyl-benzyl)-6-phenyl-6-(2-pyridyl)-fulvene, whereupon the mixture is stirred at room temperature until the solid dissolves. 2.8 g. of N-carbamylmaleimide are added and the reaction mixture is stirred at room temperature for 48 hours. The reaction mixture is then filtered and the filtrate is concentrated at ambient temperature in vacuo to a weight of 30 g. 100 ml. of carbon tetrachloride are added to the residue, the precipitated substance is filtered off, dried in vacuo and dissolved in 40 ml. of 85% ethanol by heating for a short time (1–2 minutes). On cooling 2.1 g. of one of the gemometric isomers of N-carbamyl-5-(α-hydroxy-α-2-pyridyl-benzyl)-7 - (α - 2 - pyridyl-benzylidene)-5-norbornene - 2,3 - dicarboximide-monohydrate precipitates in the form of white crystals, M.P. 142–144° C. (decomp.).

*Analysis.*—$C_{34}H_{28}N_4O_5$, molecular weight: 572.59. Calculated (percent): C, 71.31; H, 4.93; N, 9.78. Found (percent): C, 71.43; H, 5.31; N, 9.73.

EXAMPLE 3

10 ml. of water, 0.5 ml. of concentrated hydrochloric acid and 2 ml. of dioxane are added to 0.5 g. of N-carbamyl-endo-cis-5-norbornene-2,3 - dicarboximide, whereupon the reaction mixture is kept on a shaking machine at room temperature for 2 hours. The solid product is filtered off, washed with water and dried. Thus 0.34 g. of crude endo-cis-5-norbornene-2,3 - dicarboximide are obtained. The product may be recrystallized from 5 ml. of hot water, M.P. 184–187° C.

EXAMPLE 4

10 ml. of water are added to 0.5 g. of N-carbamyl-endo-cis-5-norbornene-2,3 - dicarboximide, whereupon a 40% sodium hydroxide solution is added dropwise at room temperature under shaking, until the solid product just dissolves, The clear solution is allowed to stand at room temperature for 10 minutes whereupon it is acidified with hydrochloric acid. 0.4 g. of crystalline endo-cis-5-norbornene-2,3,-dicarboximide are obtained, M.P. 185–187° C. (The melting point of the product according to J. Org. Chem. 10, 155 [1945] amounts to 184–185° C.)

The yields achieved are quantitative.

EXAMPLE 5

10 ml. of methanol are added to 1.0 g. of N-carbamyl-endo-cis-5-norbornene-2,3-dicarboximide, whereupon the mixture is refluxed on a water bath for 5 hours. On cooling 0.4 g. of a product melting at 168–172° C. are obtained in crystalline form; the melting-point of the product is increased at 185° C. after several recrystallizations carried out from ethanol. Thus endo-cis-5-norbornene-2,3-dicarboximide is obtained, which does not show a mixture-melting point-depression, when melt together with the same compound obtained by other methods.

EXAMPLE 6

5 ml. of methyl-ethyl-ketone and 0.3 ml. of pyridine are added to 0.5 g. of N-carbamyl-endo-cis-5-norbornene-2,3-dicarboximide whereupon the reaction mixture is heated on a hot water bath by using a reflux condenser for 2 hours. On cooling 0.4 g. of endo-cis-5-norbornene-2,3-dicarboximide precipitate, M.P. 178–180° C. On recrystallization from ethanol the melting point of the product amounts to 185° C. and this corresponds to the value disclosed in prior art.

EXAMPLE 7

The geometric isomer mixture of 1.75 g. of N-carbamyl-5-(α-hydroxy-α-2-pyridyl-benzyl)-7-(α - 2 - pyridyl-benzylidene)-5-norbornene-2,3-dicarboximide is dissolved in a mixture of 30 ml. of water and 1 ml. of a 40% sodium hydroxide solution. The mixture is treated with activated charcoal, filtered whereupon hydrochloric acid is added dropwise to the filtrate until the pH of some amounts to the value of 7. 1.4 g. of the geometric isomer mixture of 5 - (α - hydroxi - α-2-pyridylbenzyl)-7-(2-2-pyridyl-benzylidene)-5 - norbornene - 2,3-dicarboximide-hemihydrate precipitate in the form of a white powder. The crude product is dissolved in 10 ml. of benzene while heating, whereupon the solution is allowed to stand at room temperature for a day. Thus 0.65 g. of crystalline 5-(α-hydroxy-α-pyridyl - benzyl) - 7 - (α-2-pyridyl-benzylidene) - 5 - norbornene - 2,3-dicarboximide-hemihydrate are obtained, M.P. 178–180° C. (decomp.).

EXAMPLE 8

0.42 g. of N-carbamylmaleimide and 15 ml. of methyl-ethyl-ketone are added to a geometric isomer mixture of 1.23 g. of 2-(α-hydroxy-α-2-pyridyl-benzyl)-6-phenyl-6-(2-pyridyl)-fulvene whereupon the reaction mixture is refluxed on a water bath for 4 hours. The solvent is distilled off in vacuo, whereupon 30 ml. of water and 1 ml. of 40% sodium hydroxyde solution are added to the residue. The solution is clarified with activated charcoal, it is then filtered and the pH of the filtrate is adjusted to the value of 7 by dropwise addition of hydrochloric acid. 1.15 g. of a geometric isomer mixture of 5-(α-hydroxy-α-2-pyrididyl-benzyl) - 7 - (α-2-pyridyl-benzylidene)-5-norbornene-2,3-dicarboximide-hemihydrate precipitates in the form of a white powder.

EXAMPLE 9

60 ml. of water and 6 ml. of concentrated hydrochloric acid are added to 5.22 g. of geometric isomer-mixture of N-caramyl-5-(α-hydroxy-α-2-pyridyl-benzyl)-7 - (α-2 - pyridylbenzylidene)-5-norbornene-2,3-dicarboximide. After the dissolving of the solid substance the solution is clarified with activated charcoal, then filtered and the pH of the filtrate is adjusted to the value of 7 by dropwise addition of a 20% sodium hydroxide solution.

Thus 4.65 g. of the geometric isomer mixture of 5-(α-hydroxy-α-2-pyridyl-benzyl) - 7 - (α - 2-pyridyl-benzylidene)-5-norbornene-2,3 - dicarboximide-hemihydrate are obtained in the form of a white powder.

EXAMPLE 10

0.42 g. of N-carbamylmaleimide and 20 ml. of benzene are added to 1.23 g. of a geometric isomer mixture of 2-(α-hydroxy - α - 2 - pyridyl-benzyl)-6-phenyl-6-(2-pyridyl)-fulvene, whereupon the reaction mixture is refluxed on a hot water bath for 5 hours. The solution is then allowed to stand at room temperature while 0.55 g. of 5-(α-hydroxy-α-2-pyridyl-benzyl)-7-(α-2-pyridyl-benzylidene)-5-norbornene-2,3-dicarboximide precipitate in the form of a white crystalline substance, M.P. 183–185° C. On recrystallization from butanol the melting point of the product amounts to 190–192° C.

EXAMPLE 11

0.42 g. of N-carbamylmaleimide and 10 ml. of anhydrous dioxane are added to 1.23 g. of a geometric isomer mixture of 2-(α-hydroxy-α-2-pyridyl-benzyl)-6-phenyl-6-(2-pyridyl)-fulvene, whereupon the reaction mixture is refluxed for 4 hours. The solvent is distilled off in vacuo and the residue is dissolved in 10 ml. of benzene while warming. The solution is allowed to stand at ambient temperature for 2 days, whereupon 0.9 g. of crystalline 5 - (α-hydroxy-α-2-pyridylbenzyl)-7-(α-2-pyridyl-benzylidene)-5-norbornene-2,3-dicarboximide precipitate, M.P. 182–185° C.

EXAMPLE 12

25 ml. of anhydrous ethanol are added to the geometric isomer mixture of 1.76 g. of N-carbamyl-5-(α-hydroxy-α-2-pyridyl-benzyl) - 7 - (α-2-pyridyl-benzylidene)-5-norbornene-2,3-dicarboximide, whereupon the reaction mixture is refluxed on a hot water bath for 4 hours. The mixture is then cooled and allowed to stand at room temperature for a day and in a refrigerator for 24 hours. 0.45 g. of the geometric isomer mixture of 5-(α-hydroxy-α-2-pyridyl-benzyl) - 1 - (α-2-pyridyl-benzylidene-5-norbornene-2,3-dicarboximide having a melting point of 194–195° C. precipitates in crystalline form.

EXAMPLE 13

0.42 g. of N-carbamylmaleimide and 20 ml. of chloroform are added to 1.23 g. of the geometric isomer mixture of 2-(α-hydroxy-α-2-pyridyl-benzyl) - 6 - phenyl-6-(2-pyridyl)-fulvene, whereupon the reaction mixture is refluxed on a water bath for 5 hours. The solvent is evaporated in vacuo, whereupon 20 ml. of water and 20 ml. of hydrochloric acid are added to the residue. The solid product dissolves. The solution is clarified with charcoal, filtered and the pH of the filtrate is adusted to the value of 7 by dropwise addition of a 10% sodium hydroxide solution. A white powdery substance precipitates which is filtered off, washed with water and dried. Thus 1.5 g. (94%) of the geometric isomer mixture of 5-(α-hydroxy-α-2-pyridyl-benzyl) - 7 - (α-2-pyridyl-benzylidine)-5-norbornene-2,3-dicarboximide-hemihydrate are obtained.

*Analysis.*—$C_{33}H_{25}N_3O_3,H_2O=C_{66}H_{52}N_6O_7$; molecular weight: 1041.12. Calculated (percent): C, 76.13; H, 5.03; N, 8.07. Found (percent): C, 75.99; H, 5.02; N, 7.76.

EXAMPLE 14

15 ml. of dioxane and 5 ml. of furane are added to 2.0 g. of N-carbamylmaleimide, whereupon the reaction mixture is mildly boiled by using a reflux condenser for 2 hours. On cooling 2.85 g. of crystalline N-carbamyl-endo-cis-3,6-endoxo-1,2,3,6 - tetrahydro-phthalimide precipitates, M.P.: 132° C. (decomp.) The product may be crystallized from dioxane.

5 ml. of water are added to 1.0 g. of the product thus obtained, whereupon a 10% sodium hydroxide solution is added dropwise under shaking, until the solid substance just dissolves. The solution is then acidified with hydrochloric acid. 0.7 g. of crystaline endo-cis-2,6-endoxo-1,2,3,6 - tetrahydro-phthalimide precipitates, M.P. 160–162° C. (decomp.). The product may be crystallized from hot water.

EXAMPLE 15

1.90 g. of N-carbamylmaleimide, 25 ml. of dioxane and 10 ml. of ether are added to 3.05 g. of 6,6-diphenyl-fulvene, whereupon the reaction mixture is kept at 40° C. by using a refluxed condenser for 4 hours. A crystalline substance precipitates. The mixture is cooled, whereupon the precipitated product is filtered off. Thus 3.00 g. of the exo-isomer of N-carbamyl-7-(diphenylmethylene)-5-norbornene-2,3-dicarboximide are obtained, M.P. 180–182° C. (decomp). The product may be crystallized from methyl-ethyl-ketone.

A mixture of 15 ml. 5% sodium hydroxide solution and of 15 ml. ethanol are added to 1.0 g. of N-carbamyl-7-(diphenylmethylene)-5-norbornene - 2,3 - dicarboximide, whereupon the reaction mixture is shaken at room temperature until the solid substance is completely dissolved. About half an hour is required. The solution is then acidified with hydrochloric acid. 0.6 g. of crystalline 7-(diphenyl-methylene)-5-norbornene-2,3-dicarboximide is obtained in form of a precipitate, M.P. 205–207° C. The product may be crystallized from hot ethanol.

EXAMPLE 16

(a) A mixture of 5 ml. wter and of 4 ml. 10% sodium hydroxide solution are added to 1.0 g. of N-carbamyl-maleimide, whereupon the reaction mixture is shaken at room temperature until the solid substance dissolves. A clear solution is obtained, which is then acidified with concentrated hydrochloric acid. 0.5 g. of N-carbamyl-maleamic-acid precipitates. M.P.: 165–167° C. (decomp.). On subjecting acid product to a mixture-melting point determination together with the substance obtained by reacting maleic anhydride with urea (see J. Org. Chem. 25, 58 [1960]) no melting-point depression is observed.

(b) 7.0 g. of N-carbamylmaleimide are dissolved in 250 ml. of dioxane at room temperature, and the solution is hydrogenated in a glass hydrogenating apparatus in the presence of 3 g. of a 8% palladium-charcoal catalyst (the catalyst contains dioxane as moisture) at room temperature and at atmospheric pressure. 1260 ml. of hydrogen are taken up during an hour. The catalyst is filtered off and the filtrate is evaporated to 40 ml. in vacuo. 4.2 g. of N-carbamyl-succinimide are obtained in the form of a white crystalline substance. The product begins to sinter at 128° C. and melts at 140–141° C. while decomposition.

On crystallizing the produce from methyl-ethyl-ketone, the melting point thereof remains unchanged.

*Analysis.*—$C_5H_6N_2O_3$; molecular weight: 142.12. Calculated (percent): C, 42.25; H, 4.22; N, 19.71. Found (percent): C, 42.50; H, 4.42; N, 20.03.

(c) 0.5 g. N-carbamyl-succimide and 5 ml. of methanol are refluxed for 3 hours. The reaction mixture is then cooled and the precipitated product filtered off. 0.35 g. of a product melting at 135–138° C. are obtained. On recrystallizating the produce from dioxane several times, the melting point thereof rises to 180–181° C. The product is the succinic acid-methylester-ureide.

*Analysis.*—$C_6H_{10}N_2O_4$; molecular weight: 174.16. Calculated (percent): C, 41.37; H, 5.79; N, 16.08. Found (percent): C, 41.70; H, 5.98; N, 16.18.

The product has also been prepared by an other chemical way by means of subjecting methyl N-carbamyl-maleamate (Jour. Org. Chem. 25, 59 [1960]) to catalytic hydrogenation. 2.36 g. of maleic acid methyl ester ureide are dissolved in 100 ml. of methanol at room temperature, whereupon the solution is hydrogenated in a glass apparatus in the presence of 1.0 g. of a 8% palladium-charcoal catalyst (containing methanol in the form of moisture) at ambient temperature at atmospheric pressure.

340 ml. of hydrogen are absorbed with 15 minutes and this corresponds to 1 mole of hydrogen consumption. The reaction mixture is boiled on a water bath and the catalyst is filtered off from the hot solution. On cooling 1.80 g. of succinic acid methyl ester ureide precipitate; M.P. 180–181° C. The product is identical with that obtained according to the process described above.

(d) 10 ml. of water are added to 0.5 g. of N-carbamyl-succinimide whereupon a 10% sodium hydroxide solution is added until the solid substance is just dissolved. The clear solution is acidified with hydrochloric acid. Gas evolves while acidifying and the reaction mixture bubbles. The mixture is then evaporated to dryness in vacuo. 2 ml. of 96% ethanol are added to the residue, the mixture is boiled and the hot solution is filtered off. On cooling 0.3 g. of succinimide precipitates from the mixture. M.P. 124–125° C.

What we claim is:
1. N - carbamyl-5-($\alpha$-hydroxy-$\alpha$-2-pyridyl) - benzyl-)-7 - ($\alpha$ - 2 - pyridyl - benzylidene) - 5 - norbornene - 2,3-dicarboximide.

References Cited
UNITED STATES PATENTS 3,378,566  4/1968  Mohrbacher et al. _ _ _ _ 260—295

OTHER REFERENCES

Mohrbacher et al. (11), Chem. Abstracts, vol. 63, par. 3006, August 1965.

Dunlop and Peters, Furans, Reinhold, 1953.

NORMA S. MILESTONE, Primary Examiner

A. L. ROTMAN, Assistant Examiner

U.S. Cl. X.R.

260—296, 326, 326.3, 326.5, 534; 424—263, 274